(12) United States Patent
Sattar

(10) Patent No.: US 7,101,474 B2
(45) Date of Patent: Sep. 5, 2006

(54) METHOD AND PROCESS WITH REFRACTORY SHELF FOR HYDRODYNAMIC MIXING ZONE

(75) Inventor: Aziz A. Sattar, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 308 days.

(21) Appl. No.: 10/653,576

(22) Filed: Sep. 2, 2003

(65) Prior Publication Data

US 2004/0031728 A1    Feb. 19, 2004

Related U.S. Application Data

(62) Division of application No. 09/192,426, filed on Nov. 16, 1998, now Pat. No. 6,652,815.

(51) Int. Cl.
*C10G 11/02* (2006.01)
*C10G 11/18* (2006.01)
*C10G 35/14* (2006.01)

(52) U.S. Cl. .............. 208/113; 208/106; 208/151; 208/164

(58) Field of Classification Search .............. 208/113, 208/106, 151, 164
See application file for complete search history.

(56) References Cited

U.S. PATENT DOCUMENTS

| | | | |
|---|---|---|---|
| 3,654,140 A | 4/1972 | Griffel et al. ............... | 208/113 |
| 4,427,538 A | 1/1984 | Bartholic ..................... | 208/127 |
| 4,427,539 A | 1/1984 | Busch et al. ................ | 208/127 |
| 4,479,870 A | 10/1984 | Hammershaimb et al. .. | 208/164 |
| 4,793,913 A | 12/1988 | Chessmore et al. ......... | 208/113 |
| 4,822,573 A | 4/1989 | Timmann ................... | 422/143 |
| 4,832,825 A | 5/1989 | Mauleon et al. ............ | 208/157 |
| 5,141,625 A * | 8/1992 | Lomas ....................... | 208/113 |
| 5,173,175 A | 12/1992 | Steffens et al. ............. | 208/157 |
| 5,182,085 A | 1/1993 | Lomas et al. ............... | 422/144 |
| 5,298,155 A | 3/1994 | Sabottke .................... | 208/157 |
| 5,554,341 A | 9/1996 | Wells et al. ................ | 422/145 |
| 6,042,717 A * | 3/2000 | Radcliffe et al. ........... | 208/163 |
| 6,139,720 A * | 10/2000 | Lomas ....................... | 208/113 |
| 6,248,297 B1 * | 6/2001 | Stine et al. ................. | 422/144 |
| 6,346,219 B1 * | 2/2002 | Hedrick ..................... | 422/145 |
| 6,652,815 B1 * | 11/2003 | Sattar ........................ | 422/145 |

* cited by examiner

*Primary Examiner*—Tam M. Nguyen
(74) *Attorney, Agent, or Firm*—John G. Tolomei; James C. Paschall

(57) ABSTRACT

A shelf is incorporated into a typical FCC riser that permits the tips of the nozzles to extend past the wall of the riser while preventing the tips from promoting coke build-up and protecting the tips from erosion. The shelf can be part of an angled section that often appears in a transition zone for increasing the internal diameter of the riser to accommodate the volumetric expansion of the feed. The shelf section reduces the non-uniformity in the mixing of the catalyst and feed and minimizes backmixing of the feed injection. The shelf of this invention accomplishes these objectives without recessing the feed injectors into the riser wall which can interfere with the spray pattern.

15 Claims, 4 Drawing Sheets

METHOD AND PROCESS WITH REFRACTORY SHELF FOR HYDRODYNAMIC MIXING ZONE

CROSS-REFERENCE TO RELATED APPLICATION

This application is a Division of application Ser. No. 09/192,426 filed Nov. 16, 1998, now U.S. Pat. No. 6,652,815, the contents of which are hereby incorporated by reference in its entirety.

BACKGROUND OF THE INVENTION

This invention relates generally to the dispersing of liquids into fluidized solids. More specifically this invention relates to a method and process for dispersing a hydrocarbon feed into a stream of fluidized particles.

DESCRIPTION OF THE PRIOR ART

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking (FCC) process for the conversion of relatively high-boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

It has been found that the method of contacting the feedstock with the catalyst can dramatically affect the performance of the reaction zone. Modem FCC units use a pipe reactor in the form of a large, usually vertical, riser in which a gaseous medium upwardly transports the catalyst in a fluidized state. Ideally the feed as it enters the riser is instantaneously dispersed throughout a stream of catalyst that is moving up the riser. A complete and instantaneous dispersal of feed across the entire cross section of the riser is not possible, but good results have been obtained by injecting a highly atomized feed into a pre-accelerated stream of catalyst particles. However, the dispersing of the feed throughout the catalyst particles takes some time, so that there is some non-uniform contact between the feed and catalyst as previously described. Non-uniform contacting of the feed and the catalyst exposes portions of the feed to the catalyst for longer periods of time which can in turn produce overcracking and reduce the quality of reaction products.

It has been a long recognized objective in the FCC process to maximize the dispersal of the hydrocarbon feed into the particulate catalyst suspension. Dividing the feed into small droplets improves dispersion of the feed by increasing the interaction between the liquid and solids. Preferably, the droplet sizes become small enough to permit vaporization of the liquid before it contacts the solids. It is well known that agitation or shearing can atomize a liquid hydrocarbon feed into fine droplets which are then directed at the fluidized solid particles. A variety of methods are known for shearing such liquid streams into fine droplets.

Another useful feature for dispersing feed in FCC units is the use of a lift gas to pre-accelerate the catalyst particles before contact with the feed. Catalyst particles first enter the riser with zero velocity in the ultimate direction of catalyst flow through the riser. Initiating or changing the direction of particle flow creates turbulent conditions at the bottom of the riser. When feed is introduced into the bottom of the riser the turbulence can cause mal-distribution and variations in the contact time between the catalyst and the feed. In order to obtain a more uniform dispersion, the catalyst particles are first contacted with a lift gas to initiate upward movement of the catalyst. The lift gas creates a catalyst pre-acceleration zone that moves the catalyst along the riser before it contacts the feed. After the catalyst is moving up the riser it is contacted with the feed by injecting the feed into a downstream section of the riser. Injecting the feed into a flowing stream of catalyst avoids the turbulence and back mixing of particles and feed that occurs when the feed contacts the catalyst in the bottom of the riser. A good example of the use of lift gas in an FCC riser can be found in U.S. Pat. No. 4,479,870 issued to Hammershaimb and Lomas.

There are additional references which show the use of a lift gas in non-catalytic systems. For example, in U.S. Pat. No. 4,427,538 to Bartholic, a gas which may be a light hydrocarbon is mixed with an inert solid at the bottom part of a vertical confined conduit and a heavy petroleum fraction is introduced at a point downstream so as to vary the residence time of the petroleum fraction in the conduit. Similarly, in U.S. Pat. No. 4,427,539 to Busch et al, a $C_4$ minus gas is used to accompany particles of little activity up a riser upstream of charged residual oil so as to aid in dispersing the oil.

U.S. Pat. No. 5,554,341; U.S. Pat. No. 5,173,175; U.S. Pat. No. 4,832,825 and U.S. Pat. No. 3,654,140 all show the use of radially directed feed injection nozzles to introduce feed into an FCC riser. The nozzles are arranged in a circumferential band about the riser and inject feed toward the center of the riser. The nozzle arrangement and geometry of the riser maintain a substantially open riser cross-section over the feed injection area and downstream riser sections. The angled feed nozzles are typical of those used to inject feed or other fluids at an intermediate portion in the riser conduit. The angled feed injectors present a number of problems for the operation of the risers. The nozzles typically extend away from the wall of the riser and into the flow path of the catalyst. Passing particles over the nozzles at high velocity can result in erosion. The nozzle protrusion can also result in quiescent zones that promote backmixing and provide sites for coke build-up to begin. The protrusion of the feed injectors can provide such zones by protecting coke from the natural erosion action of the flowing catalyst which would otherwise eliminate the coke from these sites. Excessive coke build-up can upset the hydraulic balance in a unit to the point where it is eventually forced to shut down. The processing of heavier feeds such as residual hydrocarbons can exacerbate coke production problem due to their higher coking tendencies.

An obvious solution to the problem of nozzle protrusion would be to recess the nozzles completely into the wall of the riser and thereby remove them from the catalyst flow path. This solution is not satisfactory since the feed injector tips are specifically designed to provide a relatively uniform coverage of the hydrocarbon feed over the cross-section of the riser by expanding the pattern of feed injection as it exits from the nozzle. Completely recessing the tips of the injector nozzles within the wall of the riser disrupts the ability to obtain a spray pattern over the majority of the riser cross-sectional area.

It is an object of this invention to more uniformly distribute catalyst and oil over the cross-section of the riser.

It is another object of the invention to reduce areas of local variation in particle density to improve oil penetration into the particles.

It is a further object of the invention to minimize areas of backmixing and quiescence around the feed injectors that can lead to coke formation.

BRIEF SUMMARY OF THE INVENTION

These objects are achieved by providing a hydrodynamic mixing zone where a plurality of feed injectors circle an intermediate portion of a contacting conduit to inject a feed into a flowing stream of particulate material. The hydrodynamic zone is also referred to as the injector zone. The invention locates the outlets of the feed injector nozzles in a shelf from which the tips of the nozzles protrude. The shelf is formed by an abrupt change in the diameter of the conduit relative to the adjacent upstream portion of the conduit. This divergence in the diameter of the conduit locates the protruding tips of the feed injectors outside of the direct flow path of the passing particulate material and maintains active and flowing particles in the regions immediately upstream and downstream of the injector tips. The shelf thereby improves the hydrodynamics in the contacting zone by eliminating the deleterious effects of the previous protrusion of the nozzles into the particle flow without recessing the nozzles into the wall of the contacting conduit. The invention thereby reduces any non-uniformity in the mixing of the particles and feed and by eliminating sites with a high potential for backmixing of the feed with the particles.

The shelf can be part of a normal transition zone that increases the size of the riser to provide a larger riser cross-sectional area. The larger cross sectional area is usually necessary to accommodate a volumetric expansion of the feed. This expansion of the feed is sometimes referred to as a molar expansion. The injectors normally direct the incoming feed at a downstream angle with respect to the particle flow. Tapering the shelf so that it provides an angled surface between the smaller upstream diameter and larger downstream diameter of the riser further reduces any quiescent area for backmixing or coke initiation. Locating the tips of the upstream directed feed injectors about the angled shelf section virtually eliminates the quiescent areas that were sites for riser coking. This uninterrupted flow path replenishes particles and erodes away coke in the dense form downstream of the initial feed injection point. This invention is particularly suited for small diameter contacting conduits where the nozzle projection can have the most disrupting influence on the particle and feed flow through the conduit.

This invention can further reduce quiescent areas by contouring profile of the contacting conduit in the location of feed injection to more actively suite the specific spray pattern of the injectors. The injectors will often create a planar spray pattern that extends horizontally over the contacting conduit in a fan shaped pattern. The fan-shaped spray stream from several injectors will collide as they meet each other to form a polygon. Where the outer edges of each injection nozzle spray pattern project in a line to the adjacent injector, the polygon pattern will have a number of sides equal to the number of injectors. Areas outside the polygon pattern, but inside the typically circular cross-section of the contacting conduit can account for 10 to 20%, or more, of the conduit area that is not fully utilized for contacting. In accordance with this invention, the areas to the outside of the spray pattern, but within the circular cross-section of the contacting conduit may be blocked or filled in to eliminate potentially quiescent areas between the injector nozzles. Molding of a castable or pneumatically applied refractory lining to the specific contour of the spray nozzles can provide a satisfactory filler material.

Whether used with or without a contoured lining, the overall width of the injector zone is kept relatively narrow. The width of this zone will usually not exceed twice the diameter of the nozzle that provides the injector tip and, more typically, will have a total width that approximates the nozzle size.

Accordingly, within a method embodiment, this invention includes the mixing of fluidized particles with a fluid feed stream comprised of hydrocarbons to produce a dense bed of fluidized particles. To produce the dense bed of fluidized particles, the fluidized particles and a fluidizing medium are combined in an upstream section of a contacting conduit. The dense bed of fluidized particles passes downstream in the contacting conduit through an injector zone that is defined by a circumferential band of the conduit that diverges the diameter of the conduit relative to the adjacent upstream portion and that positions a plurality of discrete feed injection outlets at the wall. At least a portion of a nozzle that provides the feed injection outlet protrudes from the wall of the conduit and injects feed at an angle relative to the conduit axis into a downstream section. The protrusion of the nozzle from the wall of the conduit does not extend into an axial projection of the inner conduit wall that extends downstream from the starting point of the diverging conduit diameter. The dense bed of fluidized particles is passed downstream from the injector zone to the downstream section of the conduit that provides a less divergent diameter interior immediately downstream of the injector zone. The feed and particles are then contacted downstream of the feed injection outlets to produce a mixture of contacted feed and particles. The mixture of contacted feed and particles is then passed to a separation zone for separation of the contacted feed from the contacted particles.

In an apparatus embodiment, this invention is a contacting conduit for contacting catalyst with an at least partially liquid phase fluid. Preferably the contacting conduit is vertically oriented. The contacting conduit is elongated and has both an upstream and a downstream end. The upstream end of the contacting conduit defines a particle inlet for adding particles and a fluidizing inlet to inject a fluidizing medium and to produce a dense particle bed. Between the upstream and downstream ends of the contacting conduit is a narrow band that defines a discontinuous increase in the inside diameter of the conduit from the upstream to the downstream ends of the conduit and thus divides the conduit into upstream and downstream sections. Circling the conduit and fixed with respect to the band, a plurality of feed injectors define outlet nozzles that extend from the inside wall of the riser and remain outside the projection of a surface projected along the axis of the conduit from the inner circumference of the upstream conduit at its junction with the band. And at the other end of the vertical contacting conduit is the downstream end that defines a fluid outlet.

Additional objects, embodiments and details of this invention can be obtained from the following detailed description.

DETAILED DESCRIPTION OF THE INVENTION

This invention will be described in the context of an FCC process for the catalytic cracking of hydrocarbons by contact with a fluidized catalyst. The invention may be used in any process that requires a dispersion of a fluid into a fluidized particle stream as it passes through a conduit.

Figure 1:
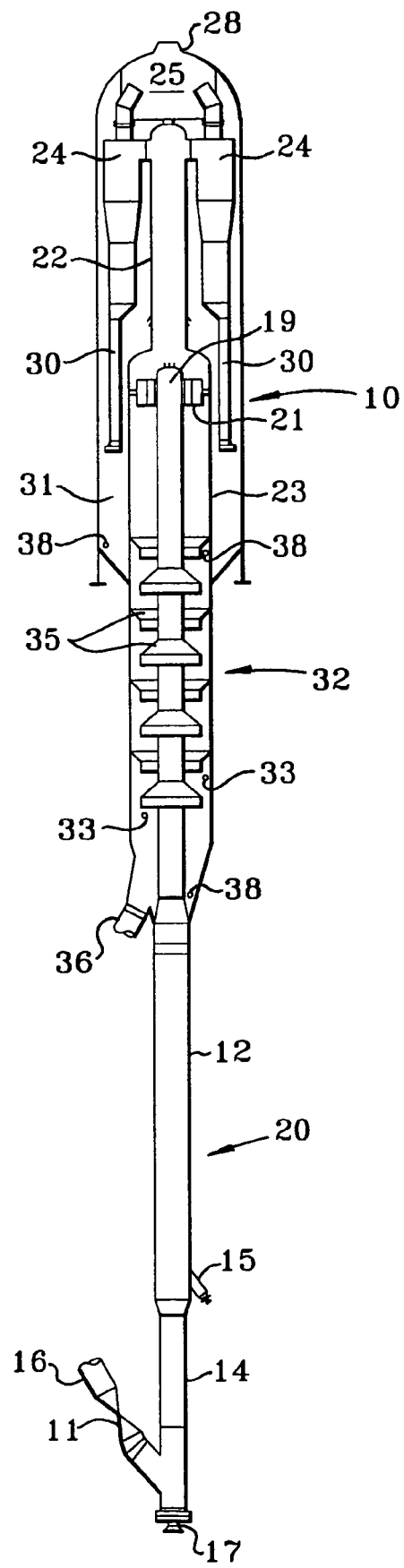
FIG. 1 is a sectional elevation of an FCC reactor and riser.

In a typical FCC process flow arrangement, finely divided regenerated catalyst leaves a regeneration zone and contacts a feedstock in a lower portion of a reactor riser zone. FIG. 1 shows a reactor 10 with a vertical riser 20 having an upper section 12 and a lower riser portion 14 into which a regenerator standpipe 16 transfers catalyst from a regenerator (not shown) at a rate regulated by a slide valve 11. A fluidization medium enters the riser through a nozzle 17 and a suitable distribution device (not shown). The fluidizing medium may be a diluent material, typically steam, or a hydrocarbon stream that undergoes some conversion or passivates the catalyst. The fluidized catalyst flows upwardly through lower riser portion 14 at a relatively high density until it reaches a plurality of feed injection nozzles 15 (only one is shown) that inject a hydrocarbon feed across the flowing stream of catalyst particles. Upper riser section 12 has a larger internal diameter than lower section 14 to accommodate the volumetric expansion of the feed as it expands through contact with the hot catalyst. While the resulting mixture, which has a temperature of from about 200° to about 700° C., passes up through the remainder of the riser, conversion of the feed to lighter products occurs and coke is deposited on the catalyst. The effluent from the riser is discharged from the top 19 of riser 20 through a disengaging arm 21 that tangentially discharge the mixture of catalyst and gases into a disengaging chamber 23 to effect a separation of the gases from the catalyst. A transport conduit 22 carries the hydrocarbon vapors and entrained catalyst to one or more cyclone separators 24 that separate any spent catalyst from the hydrocarbon vapor stream.

A collection chamber 25 gathers the separated hydrocarbon vapor streams from the cyclone for passage from an outlet nozzle 28 into a fractionation zone (not shown) known in the art as the main column. The main column separates the hydrocarbon vapors into such typical fractions as light gases and gasoline, light cycle oil, heavy cycle oil and slurry oil. Various fractions from the main column can be recycled along with the feedstock to the reactor riser. Typically, fractions such as light gases and gasoline are further separated and processed in a gas concentration process located downstream of the main column. Some of the fractions from the main column, as well as those recovered from the gas concentration process may be recovered as final product streams.

The separated spent catalyst from cyclones 24 passes through dip legs 30 into the lower portion of collection space 31 and eventually passes into a stripping zone 32 across ports (not shown) defined by the bottom of disengaging chamber 23. Catalyst separated in disengaging chamber 23 passes directly into stripping zone 32. A stripping gas, usually steam, enters a lower portion of stripping zone 32 through an inlet 33 and may be distributed by one or more distributors (not shown). The stripping gas contacts the spent catalyst to purge adsorbed and interstitial hydrocarbons from the catalyst. A series of baffles 35 in the stripping zone improves contact between the catalyst and stripping gas. Additional gas for fluidization or stripping may be added through one or more inlets 38.

The spent catalyst containing coke leaves the stripping zone through a reactor conduit 36 and passes into the regeneration zone where, in the presence of fresh regeneration gas and at a temperature of from about 620° to about 760° C., combustion of coke produces regenerated catalyst and flue gas containing carbon monoxide, carbon dioxide, water, nitrogen and perhaps a small quantity of oxygen. Usually, the fresh regeneration gas is air, but it could be air enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and in repetition of the previously mentioned cycle, contacts the feedstock in the reaction zone.

Catalysts that can be used in this process include those known to the art as fluidized catalytic cracking catalysts. Specifically, the high activity crystalline aluminosilicate or zeolite-containing catalysts can be used and are preferred because of their higher resistance to the deactivating effects of high temperatures, exposure to steam, and exposure to metals contained in the feedstock. Zeolites are the most commonly used crystalline aluminosilicates in FCC.

Catalyst entering the lower section 14 of the riser conduit preferably forms a dense catalyst bed. The term "dense bed" refers to a region of catalyst having a density of at least 20 lb/ft$^3$. The dense bed zone is also termed a bubbling bed which provides good mixing of the catalyst and a uniform suspension of catalyst as it passes into contact with feed from injection nozzles 15. The quantity of fluidizing gas entering the bottom of the riser is usually added in an amount that creates a low upward velocity of catalyst having a velocity of less than 6 ft/sec and usually in a range of from 3 to 5 ft/sec. This invention does not require a specific gas composition for the fluidizing medium. Steam can serve as a suitable fluidizing medium. The fluidizing medium can also comprise a typical lift gas and can be used by itself or in combination with steam. Lift gas typically includes not more than 10 mol-% of $C_3$ and heavier hydrocarbons. In addition to hydrocarbons, other reaction species may be present in or comprise the fluidizing mediums such as $H_2$, $H_2S$, $N_2$, $CO$ and/or $CO_2$.

In accordance with typical FCC practice the feed exits injection nozzles 15 as a spray in a fan pattern. The nozzles are usually angled to tip the fan pattern in a downstream direction. The angle of the nozzles will typically be in a range of from at least 20° and less than 70° with respect to a transverse plane passing through the nozzles. Droplet size within the spray and the velocity of the spray determines momentum of the feed as travels across the open riser section. It is difficult to increase the momentum of the feed above a given level since the velocity of the feed injection is inversely proportional to the size of the droplets in the emanating spray. Higher velocities for the spray tend to directly increase the momentum of the spray but indirectly decrease the momentum by reducing the size of the exiting droplets. Conversely the reduced momentum that results directly from lower spray velocities is offset by the typical production of larger droplets. An expanding gas or gaseous component such as steam may be used in conjunction with another source of energy in order to break up the liquid. This other source of energy can consist of a high pressure drop for the gas and liquid mixture. Supplying additional energy makes up for inadequate mixing so that a fine and uniform distribution of droplets will still be obtained once the feed is injected into the catalyst. It is also known that the pressure drop across an orifice or port can be reduced while still obtaining a good dispersion of fine liquid droplets by blending and homogenizing the liquid and any added gas sequentially in stages of increased mixing severity. The feed entering the feed injectors will usually have a temperature below its initial boiling point but a temperature above the boiling point of any steam or gaseous hydrocarbons that enter the distribution device along with the liquid. A minimum quantity of gaseous material equal to about 0.2 wt-% of the combined liquid and gaseous mixture, is often commingled with the liquid entering the injectors. The gaseous material may be introduced into the injectors in any manner.

Figure 2:
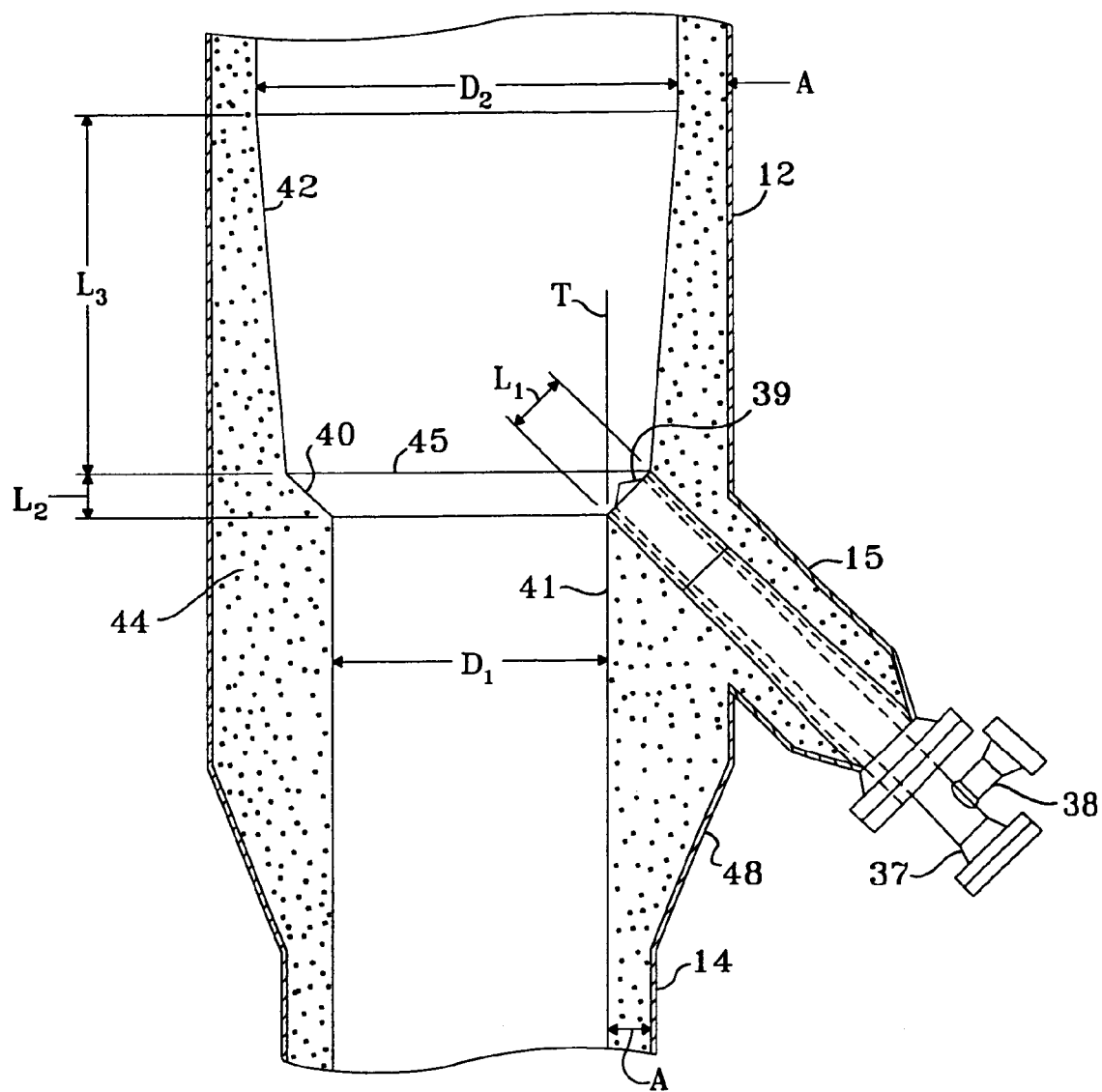
FIG. 2 is an enlarged section showing a mid portion of the riser of FIG. 1.

Following mixing and ejection, contact of the feed with the hot catalyst creates a volumetric expansion from both the vaporization of liquid hydrocarbons and heating of the vapor as well as cracking of the hydrocarbons into lower molecular weight species. FIG. 2 more clearly shows the configuration of the feed injection nozzles 15 and the inner configuration of the riser wall that defines the shelf 40 of this invention. Feed enters the back of injection nozzle 15 via a nozzle 37. Diluents, as previously described, can be injected through a nozzle 38 and mixed with the feed. A tip 39 of the injector disperses the feed in an extended horizontal fan pattern through an appropriately designed outlet nozzle.

The inside of the riser undergoes various changes in diameter to accommodate the shelf and any requirements for changes in the flowing cross-sectional area to provide the desired velocity and flow regime. Catalyst flowing upwardly from lower portion 14 travels through an internal section 41 of the riser that has a uniform diameter $D_1$. As the catalyst passes upwardly into an injection zone defined by the ring of feed injectors 15 an abruptly enlarged section defines the feed injection zone that contains the circumferentially extended band of feed injectors 15. The abrupt enlargement is shown as shelf 40 which has a frusto-conical geometry. However, it is not necessary to this invention that the shelf 40 have a flat surface. Contoured surfaces that transition to the upper riser section 12 may also provide an effective geometry for shielding the injector tips 39. Where a frusto-conical section defines the injector zone as in FIG. 2 its included angle will usually be in a range of from 40 to 140°. The outlets of the injectors will usually occupy at least half of the length along the wall of the injection zone. Thus, the length $L_1$ along the injector wall will usually not exceed twice the nozzle dimension. In this arrangement total length $L_1$ of the shelf 40 along the internal riser wall is taken up by the feed injector at the points of feed injection. This narrowly defined injection zone results in an increase in the conduit diameter over the injection zone that is less than the width of the nozzles defining the injection outlets. The overall axial length $L_2$ of the injector zone will typically not exceed 8 inches.

The portion of the riser immediately upstream of the injector zone need not have a uniform diameter, but may be diverging of converging as necessitated by process requirements. An essential requirement of the invention is that the lower section of the riser define a trajectory as shown along line T for the particles flowing upwardly past injector tip 39. This trajectory line T may be defined as the upstream axial projection of that portion of the riser located below the injector zone. Thus the trajectory line T will represent either a cylindrical surface or a diverging frusto-conical section. It is essential to this invention that tips 39 of the nozzles not extend past this projected trajectory of the particles from the lower riser portion.

Figure 3:
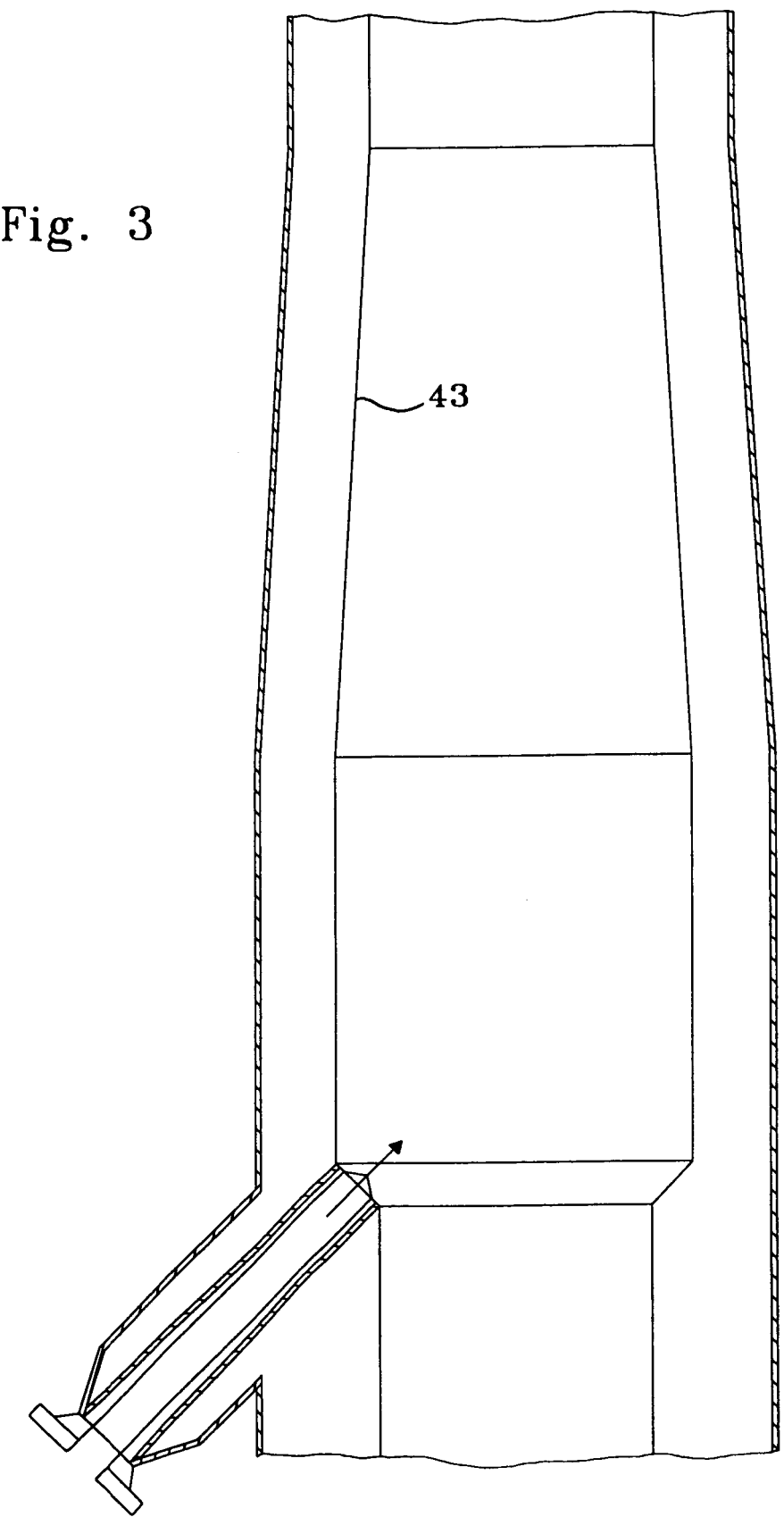
FIG. 3 is a modified section of the riser section of FIG. 2.

The end of the injection zone is defined by a portion of the conduit that has a more constant diameter over its length than the injection zone. The upper part of the hydrodynamic injection section that defines the injector zone 40 ends with another change in the relative slope of the riser wall, shown by line 45, such that the downstream portion of the riser has at least a less diverging diameter than the diameter increase across the injector zone 40. Any variation in the diameter outside of the injector zone will typically not exceed a 1 in 4 slope. Therefore, the length $L_3$ of a diverging section 42 as shown downstream of injector zone 40 in FIG. 2 will have sufficient length $L_3$ to provide a mild diameter divergence until it expands to the diameter $D_2$. As shown by FIG. 3, the diameter of the riser downstream of the injection zone may be reduced where desired by a converging diameter section 43.

Referring again to FIG. 2, the internal configuration of the contacting conduit may be fully defined by adjusting the thickness of a refractory lining material 44 contained within the conduit. For example, lower section 44 would typically have a lining thickness A of 4 to 5 inches. The lining thickness may be varied as necessary inside the riser without corresponding changes in the outer diameter of the conduit at the same locations. A swedge section 48 increases the external diameter of the riser to a uniform upper diameter for upper section 12. The internal diameter $D_1$ of the riser remains constant over the increase of diameter from riser portion 14 to riser section 12. The shelf as well as the more mildly diverging downstream section 42 are defined completely by variations in the thickness of the refractory lining until the lining thickness is again reduced to a thickness A that matches the thickness of the lining below swedge section 48.

Figure 4:
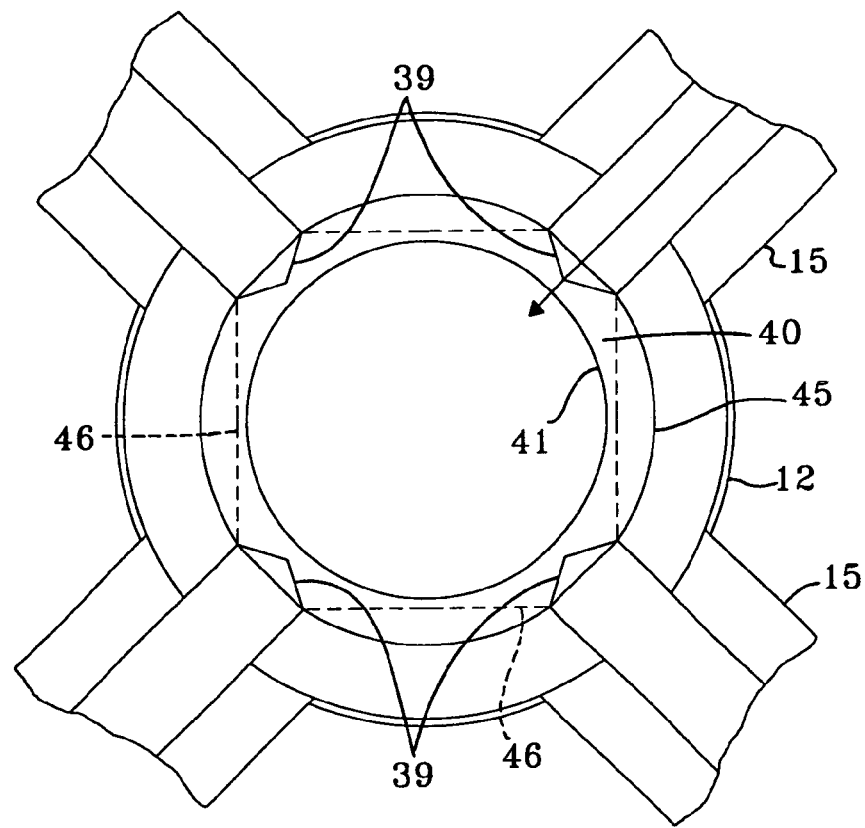
FIG. 4 is a plan view of a nozzle arrangement.

The injectors and the shelf defined by the refractory lining are shown in plan by FIG. 4. FIG. 4 shows the preferred arrangement wherein the injection zone includes at least 4 injector outlets. Shelf 40 extends horizontally between the inner diameter of lower portion 41 and the change in slope that marks the downstream end of the injector zone about line 45. FIG. 4 also shows the extension of tips 39 outwardly over the shelf section 40. The horizontal extent of the fan spray pattern for the feed injected by each nozzle 39 is represented by dashed lines 46. Except for the area of the spray tips 39 the overlapping spray pattern has a polygonal shape.

Figure 5:
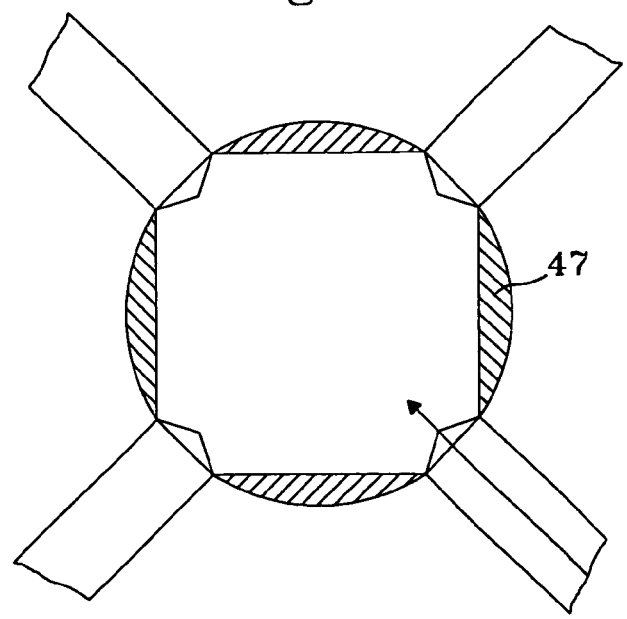
FIG. 5 is a modified plan view of the nozzle arrangement of FIG. 4.

The outer projection of the polygon from the overlapping spray pattern leaves an area that does not receive a directed flow feed from the nozzle arrangement. FIG. 5 shows the concavity of the riser cross section at the location of the feed injection nozzles may be filled in the cross-hashed area 47 to block this region from catalyst flow. In this arrangement, the area to the outside of a cord line drawn between the nozzles and to the inside of the circular diameter of the riser at the location of the spray tips is blocked so that the polygonal shape of the spray pattern receives an upwardly directed flow of catalyst that matches the geometry of the spray pattern. The concavity of the riser between the nozzle tips need not be fully filled and any decrease in the concavity between the nozzle tips will reduce the area of catalyst that receives the reduced concentration of the feed. Reducing the concavity of the conduit between the injection nozzles result in walls that have a greater degree of discontinuity at the nozzle locations relative to the locations between the nozzles. The blocked portion 47 may be gradually reduced in the downstream direction of catalyst flow until the riser again has an overall circular cross-section. This arrangement thereby decreases the concavity of the conduit wall in a direction normal to the conduit access between the adjacent nozzle locations.

What is claimed is:

1. A method of mixing fluidizable particles with a fluid feed stream comprising hydrocarbons, said method comprising:
   a) combining fluidized particles and a fluidizing medium in an upstream section of a contacting conduit to produce a dense bed of fluidized particles;
   b) passing said dense bed of particles downstream in said contacting conduit through an injector zone defined by a circumferential band of the conduit that diverges the diameter of the conduit relative to the adjacent upstream portion of the conduit and that positions a plurality of discrete feed injection outlets at the wall with at least a portion of a nozzle to provide the outlet protruding from the wall of the conduit to inject feed at an angle relative to the conduit axis into a downstream section of the conduit wherein the protrusion of the nozzle from the wall of the conduit does not extend past an axial projection of the inner conduit wall from a point just upstream of the diverging conduit diameter;
   c) passing the dense bed of particles downstream from the injector zone to a downstream section of the conduit that provides a less divergent conduit diameter interior immediately downstream of the injector zone and contacting the feed and particles downstream of the feed injection outlets to produce a mixture of contacted feed and particles; and
   d) passing said feed and particles to a separation zone for the separation of contacted feed from particles.

2. The method of claim 1 wherein the concavity of the conduit wall in a direction normal to the conduit axis is reduced between adjacent nozzle locations.

3. The method of claim 2 wherein the flow area of the injection zone has a restricted circular flow area that blocks fluid flow in a blocked area located to the outside of a chord line extended between the nozzles and the blocked area diminishes in a continuous taper to open the flow area of the conduit to a full circular cross section in the downstream section.

4. The method of claim 1 wherein said conduit is a vertically oriented riser conduit and said dense bed is formed in a lower section of said conduit.

5. The method of claim 4 wherein said fluidizing gas passes through said dense bed at a velocity of from 3.0 to 5.0 ft/sec.

6. The method of claim 1 wherein the particle density in said dense bed is greater than 20 lb/ft$^3$.

7. The method of claim 1 wherein the outlets occupy at least half of the length of the injection zone along the conduit wall.

8. The method of claim 1 wherein the injection zone includes at least four injector outlets.

9. The method of claim 1 wherein the injection outlets inject the feed at a downstream angle, with respect to a plane extending through the outlets, of at least 20° and less than 70°.

10. The method of claim 1 wherein the axial length of the injection zone does not exceed 8 inches.

11. The method of claim 1 wherein the conduit has a uniform diameter upstream of the injection zone and a diverging diameter downstream of the injection zone.

12. The method of claim 1 wherein the conduit has a converging diameter downstream of the injection zone.

13. The method of claim 1 wherein the increase in conduit diameter over the injection zone is less than the width of the nozzles defining the injection outlets.

14. The method of claim 1 wherein the particles comprise FCC catalyst.

15. A process for the fluid catalytic conversion of a hydrocarbon feed comprising:
   a) combining catalyst particles and a fluidizing medium in a lower portion of an riser conduit to produce a dense bed of fluidized particles;
   b) passing said dense bed of particles up the riser and into an injector zone defined by an abruptly enlarged section of the riser interior and by a ring of feed injectors fixed with respect to the enlarged internal section of the conduit that positions feed outlet nozzles to extend from the riser interior but not to extend into the direct trajectory of the upwardly flowing dense bed of particles which trajectory is defined by the upward axial projection of the riser section below the injector zone;
   c) passing the dense bed of particles and feed from the injector zone to an upper section of the riser having a more constant diameter than the injection zone to convert the feed to a converted product in the presence of the catalyst particle;
   d) passing the catalyst particles and converted feed to a separation zone for and at least partial separation of converted product from the particles; and
   e) recovering a converted product and recycling particles to the bottom of the riser.

* * * * *